United States Patent [19]

Cheng

[11] Patent Number: 5,035,527
[45] Date of Patent: Jul. 30, 1991

[54] LOCKING BODY

[76] Inventor: Far Cheng, 155 Liteh Street, Taichung City, Taiwan

[21] Appl. No.: 471,771

[22] Filed: Jan. 29, 1990

[51] Int. Cl.⁵ .................................. F16B 7/10
[52] U.S. Cl. .................................. 403/109; 403/316
[58] Field of Search ............... 403/109, 104, 110, 315, 403/316, 321, 373, 374, 375, 345; 248/188.5

[56] References Cited

U.S. PATENT DOCUMENTS

| | | | |
|---|---|---|---|
| 2,739,361 | 3/1956 | Elsner | 403/316 X |
| 4,174,900 | 11/1979 | Ina | 403/109 X |
| 4,329,078 | 5/1982 | Crates et al. | 403/316 |
| 4,650,145 | 3/1987 | Natzel et al. | 248/188.5 X |
| 4,694,544 | 9/1987 | Chapman | 403/316 X |

Primary Examiner—Peter M. Cuomo
Attorney, Agent, or Firm—Schweitzer, Cornman & Gross

[57] ABSTRACT

A locking body is adapted to be utilized in connection with an engagement device mounted to an elongated member of consistent cross-section along at least a portion of its length adjacent the engagement device. The engagement device includes an operating arm having an operative position generally parallel to the longitudinal axis of the elongated member. The locking member includes a pair of opposed legs mounted to a main body portion, the legs being adapted to embrace the elongated member with a sliding frictional fit. The main body portion has a cavity formed therein dimensioned to accept the operating arm when the locking body is slid into an abutting relationship with the engagement device.

3 Claims, 2 Drawing Sheets

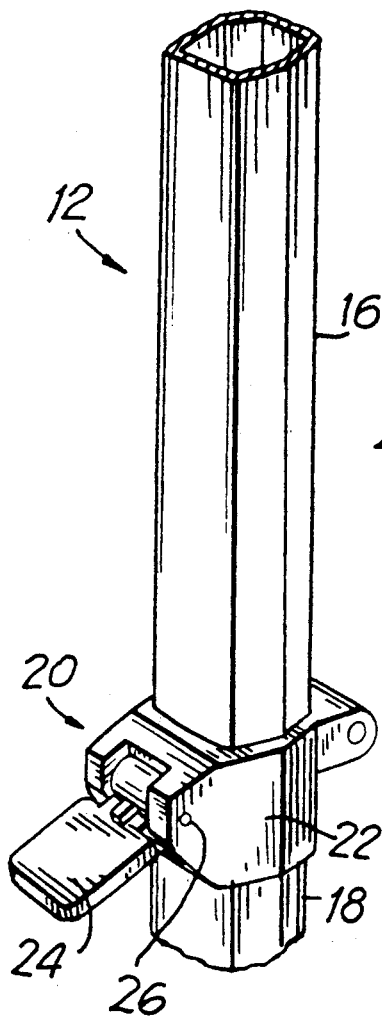
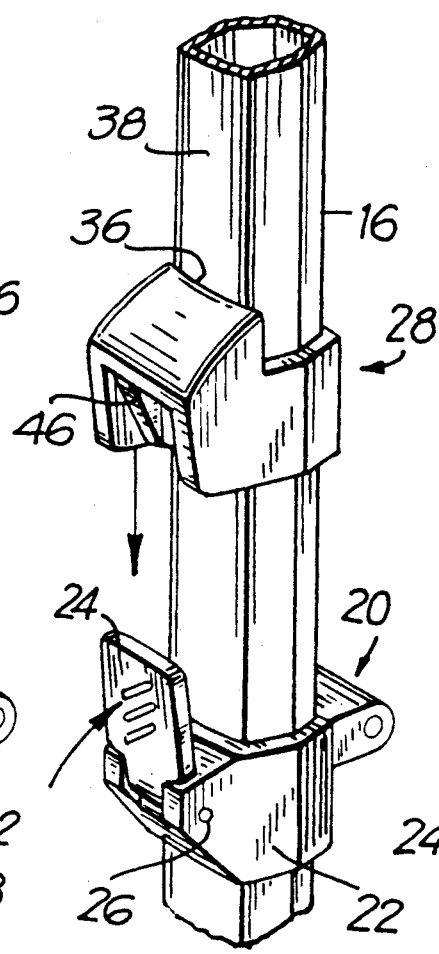
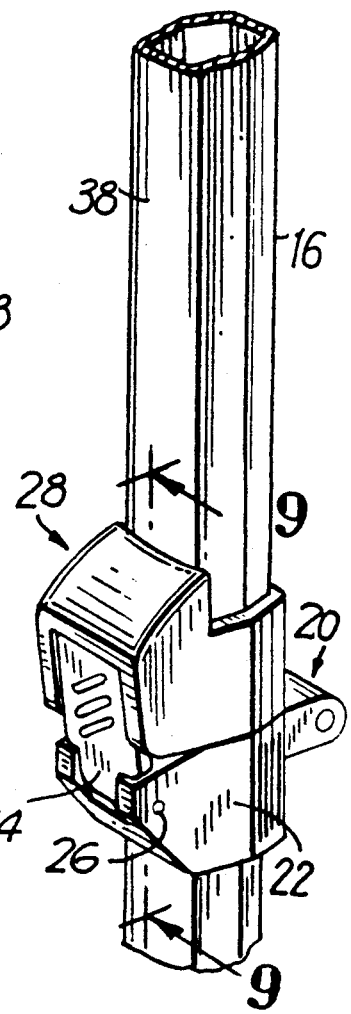
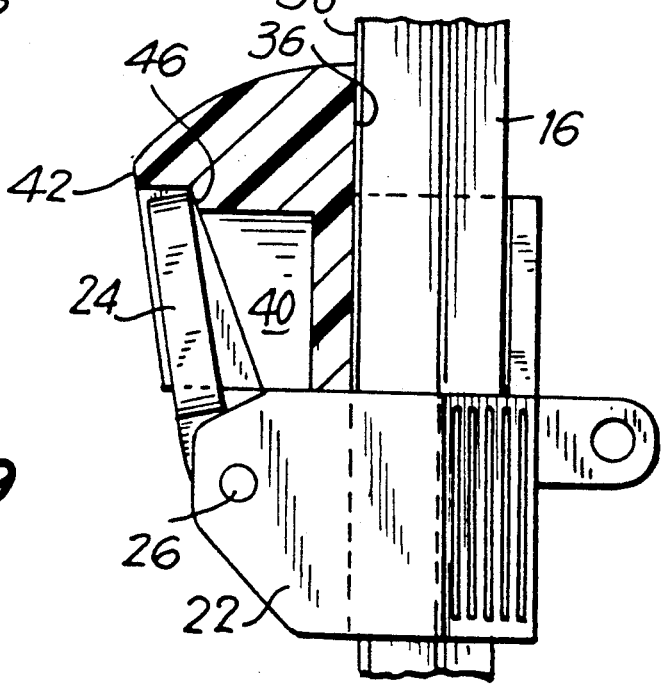

1

LOCKING BODY

The present invention relates to a locking body, and in particular, to a locking body intended to restrict access to an operating arm of the type utilized in connection with the fixing of telescoping legs such as utilized in camera tripods and similar equipment.

BACKGROUND OF THE INVENTION

Numerous articles of equipment, such as tripod units, utilize leg assemblies formed of a plurality of individual hollow leg elements which telescope together and are extended as required to provide a leg of the appropriate overall length. Typically, the telescoped leg elements are maintained in proper position by a clamp element located at the end of an outer leg element, and which, when engaged, firmly grip the inner, projecting leg element to provide a rigid assembly. Such lock members are typically provided with an operating arm or handle having a first, unlocked position and a second, locked position in which frictional engagement with the extending leg element is maintained.

While the utilization of the arm or handle allow for precise and sure positioning of the leg elements, such use suffers from the disadvantage that the handle can be inadvertently snagged and moved from the locked position, thereby releasing the leg lock and causing the immediate collapse of the leg. This may have particularly disastrous consequences when the legs are incorporated into a tripod assembly supporting expensive photographic or video equipment.

It is thus a purpose of the present invention to provide an assembly which may be utilized in connection with friction-type clamping elements or other devices having an exposed operating arm or handle having a position to be protected from inadvertent release.

Yet another purpose of the present invention is to provide such an apparatus which may be utilized in connection with tripod legs and similar equipment of conventional construction, and which is efficient and simple to operate and may be manufactured economically.

BRIEF DESCRIPTION OF THE INVENTION

In accordance with the above and additional features and objects, the present invention comprises a locking body having a frame-embracing portion adapted to fit about a tripod leg or similar element to which a clamping member or similar device having an operating lever is affixed. The frame-embracing portion allows the locking body to be slid along the frame into position adjacent the clamping member to secure the operating lever, away from the clamping member to allow access to the operating arm. The embracing portion is affixed to the main body portion of the locking body which has an aperture located therein. The aperture is adapted to embrace the operating arm of the clamping member, thus preventing access to the arm and inadvertent operation thereof when the lock body is positioned adjacent the clamping member. When access to the operating arm is desired, the locking body is slid away from the clamping member, allowing the arm to be operated.

BRIEF DESCRIPTION OF THE DRAWINGS

A fuller understanding of the present invention will be comprehended upon consideration of the following detailed description of preferred embodiments thereof when taken in conjunction with the annexed drawings, wherein:

FIG. 6 is a perspective view of a tripod leg illustrating the leg clamping member with which the present invention is employed;

FIG. 7 is a perspective view of a tripod leg depicting the invention in place thereon preparatory to engagement with the clamping member;

FIG. 8 is a perspective view of a tripod leg with the invention in the operating arm-protecting position; and FIG. 9 is a elevational cross-section view of the invention taken along line 9—9 of FIG. 8.

DESCRIPTION OF THE PREFERRED EMBODIMENTS

Figure 1:
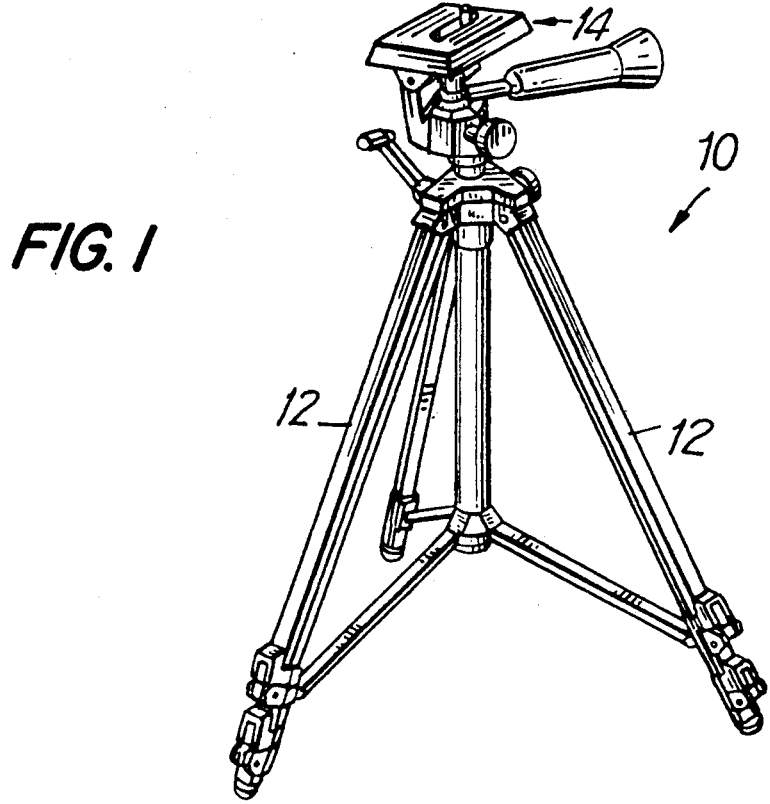
FIG. 1 is a perspective view of a typical tripod with which the present invention is utilized.

Referring initially to FIG. 1, the present invention is intended to be utilized with equipment such as a tripod 10 having a plurality of legs 12 supporting a head 14 upon which a camera or the like may be mounted. As may be further seen in FIG. 6, each of the legs 12 includes two or more individual leg elements 16, 18 having similar cross-sections, and which are adapted to interfit and telescope as known in the art. As depicted in FIG. 6, second leg element 18 is dimensioned to fit and slide snugly within first leg element 16.

In order to maintain the individual leg elements in the appropriate position with respect to each other, a clamping member 20 is employed. Such a device is typically affixed to the end of the outer leg element, such as element 18, and includes a housing 22 supporting a cam element engaged by an operating arm 24 pivoting about pin 26. The operating arm is pivotable from a first position shown in FIG. 6 in which the operating arm is extended and the cam element disengaged from contact with first leg element 16, to a second position, depicted in FIG. 7, in which the operating arm 24 lies parallel to the longitudinal axis of the leg, the cam element contacting and engaging the leg 16 and retaining it in a fixed position with respect to second leg element 18.

The present invention provides a lock or guard function for the operating arm 24 when in the position depicted in FIG. 7, to prevent against inadvertent movement of the operating arm which would release the grip upon leg element 16.

Figure 2:
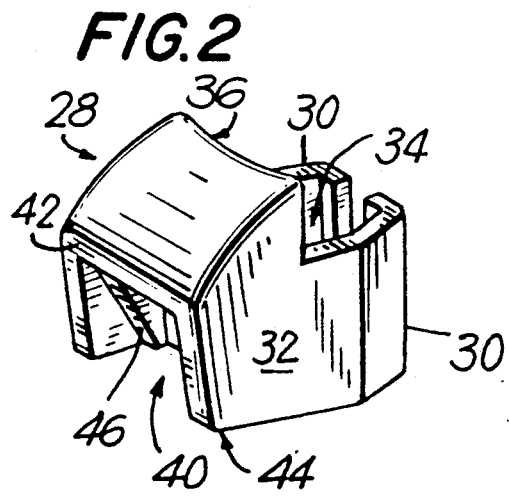
FIG. 2 and 3 are perspective views of a first embodiment of the invention utilized in conjunction with leg units having an elongated cross-section.
Figure 3:
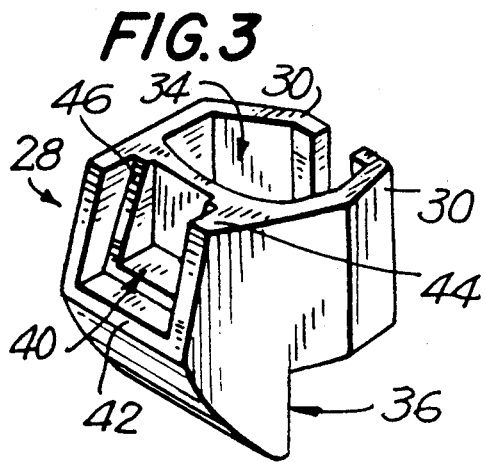

As best seen in FIGS. 2 through 5, the locking body 28 of the present invention, which may be formed of a unitary piece of an appropriate rigid yet resilient material, such as nylon, plastic or the like, includes a pair of opposed legs 30 depending from a main body portion 32. The lower surface of the main body portion 32 from which the legs extend in conjunction with the inner surfaces of the legs 30 define a through aperture 34 whose cross-section duplicates the cross-section configuration of the tripod leg 12 element upon which it is to be installed. With respect to the leg element 16, for example, the aperture is of a generally elongated configuration, as depicted in FIGS. 2 and 3. The locking body may be utilized in connection with leg elements having other cross-sections, for example circular, in which the configuration depicted in FIGS. 4 and 5 may be utilized. The specific dimensions of the aperture 34 are chosen to allow a snug friction fit upon the leg element, but which allows positioning along the length of the leg element as may be required.

It is to be recognized that the term "leg element", as used herein, can encompass elements other than legs which have a constant cross-section over a portion of the length along which the lock body is to slide and which are utilized in connection with a device having an operating handle sought to be protected.

Main body portion 32 of the locking body may be formed in the general shape of a trapezoidal prism having a bottom ledge surface 36 extending beyond the legs 30 whose profile corresponds to the cross-sectional profile of the leg element portion against which it rests. As seen in FIG. 7, the bottom surface 34 of the lock body of FIGS. 2 and 3 is gently rounded to engage the side 38 of first leg element 16. Main body portion 32 is provided with a cavity 40 extending inwardly from its top surface 42 and end surface 44, the cavity being dimensioned to accept operating arm 24 when in the leg-parallel position depicted in FIG. 7. The height of the body portion is chosen such that the cavity sidewall formed by the remaining top surface 42 of the body is marginally higher than the top surface of the operating arm 24, as can be seen in FIG. 9, such that the operating arm 24 is recessed within the cavity to prevent engagement therewith.

Figure 4:
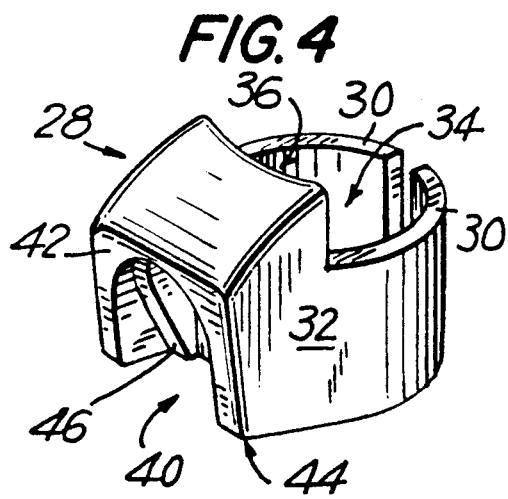
FIGS. 4 and 5 are perspective views of an alternative embodiment of the invention utilized in conjunction with leg units having a generally circular cross-section.
Figure 5:
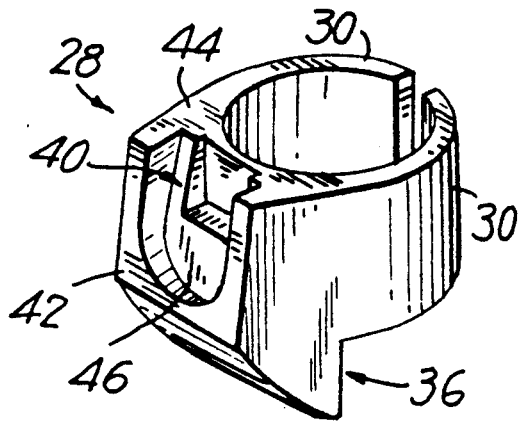

The portion of the cavity 40 directly adjacent the operating arm 24 may be contoured as appropriate for the shape of the arm to provide a closely-embracing fit. Such contouring may take the form of a rectangular outline, as depicted in FIGS. 2 and 3 to mate with the rectangular operating arm of FIGS. 6-9, for example, or with a curved outline, as depicted in FIGS. 4 and 5, to accommodate a similarly-shaped operating arm. In addition, the cavity may be provided with a peripheral shoulder 46 formed in the main body portion 32 to provide a stop and support for the operating arm.

As shown in FIG. 7, the locking body 28 is inserted upon leg element 16 such that the cavity 40 faces the clamping 20 and arm 24 with which it is to be engaged. In the unengaged position, the locking body is positioned distal from the clamping element, which allows unrestricted access to the arm 24. When the arm is activated and placed in the locking position, as depicted in FIG. 7, the locking body 28 is slid along the leg element 16 towards the locking element 20, as depicted by the arrow in FIG. 7 whereby the lever arm 24 is embraced by the cavity 40. Alternatively, the locking body 28 can be slid into the engaging position prior to operating arm motion, as the arm can still be received by cavity 40.

As shown in FIG. 8, the locking body 28 is in an abutting relationship with the clamp unit 20, and fully surrounds the edges of operating arm 24, preventing contact therewith in a manner which could cause the release of the clamping or camming action. Because of the friction fit of the locking body upon the leg element, it remains in position irrespective of the orientation of the leg. When release of the operating arm is required, however, the locking body can be easily slid along the leg element away from the arm, whereby the arm may be operated in the typical manner.

I claim:

1. A locking body adapted to be utilized in association with an engagement device mounted to an elongated member of consistent cross-section along at least a portion of its length adjacent the engagement device, the engagement device including an operating arm element having a free end with an operative position generally parallel to the longitudinal axis of the elongated member and displaced from the surface thereof, said locking body comprising a pair of opposed legs mounted to a main body portion, said legs being adapted to embrace said elongated member with a sliding frictional fit; said main body portion having a cavity formed in the interior thereof through a side wall and a top wall thereof, said cavity having a bottom bounded by a cavity side wall and a peripheral shoulder, said cavity being dimensioned to accept said free end of said operating arm, said free end being embraced and surrounded by said cavity side wall and being positioned and supported above said bottom upon said peripheral shoulder when said locking body is slid into an abutting relationship with said engagement device.

2. The locking body of claim 1, wherein said cavity side wall projects above the plane defined by said operating arm in said parallel position.

3. The locking body of claim 1, wherein said main body portion is in the general shape of a trapezoidal prism.

* * * * *